Oct. 13, 1970  R. D. ANDERSON  3,533,519
TRANSFER APPARATUS FOR ELONGATED PADS AND THE LIKE
Original Filed April 21, 1964  5 Sheets-Sheet 1
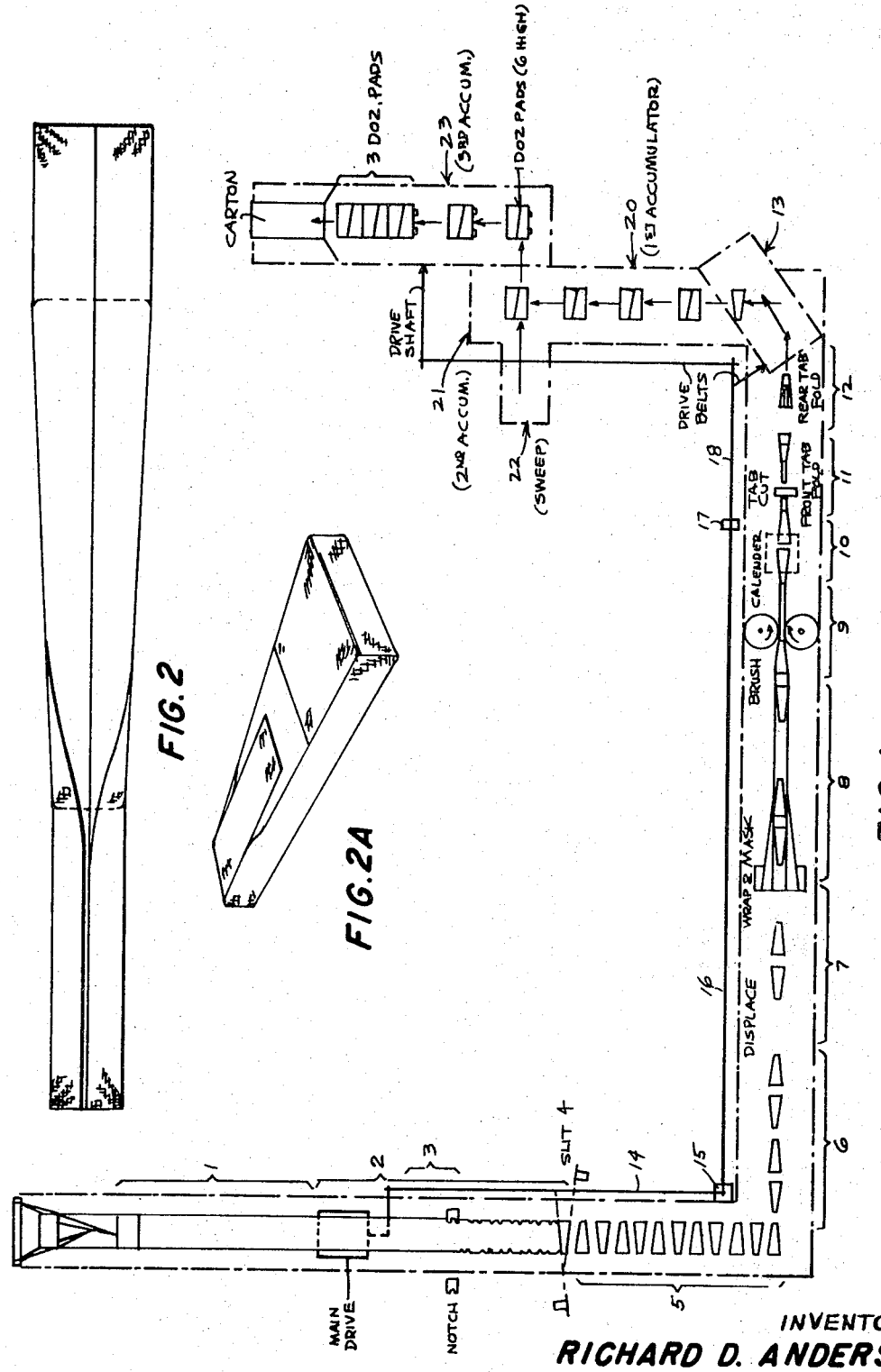
INVENTOR
RICHARD D. ANDERSON

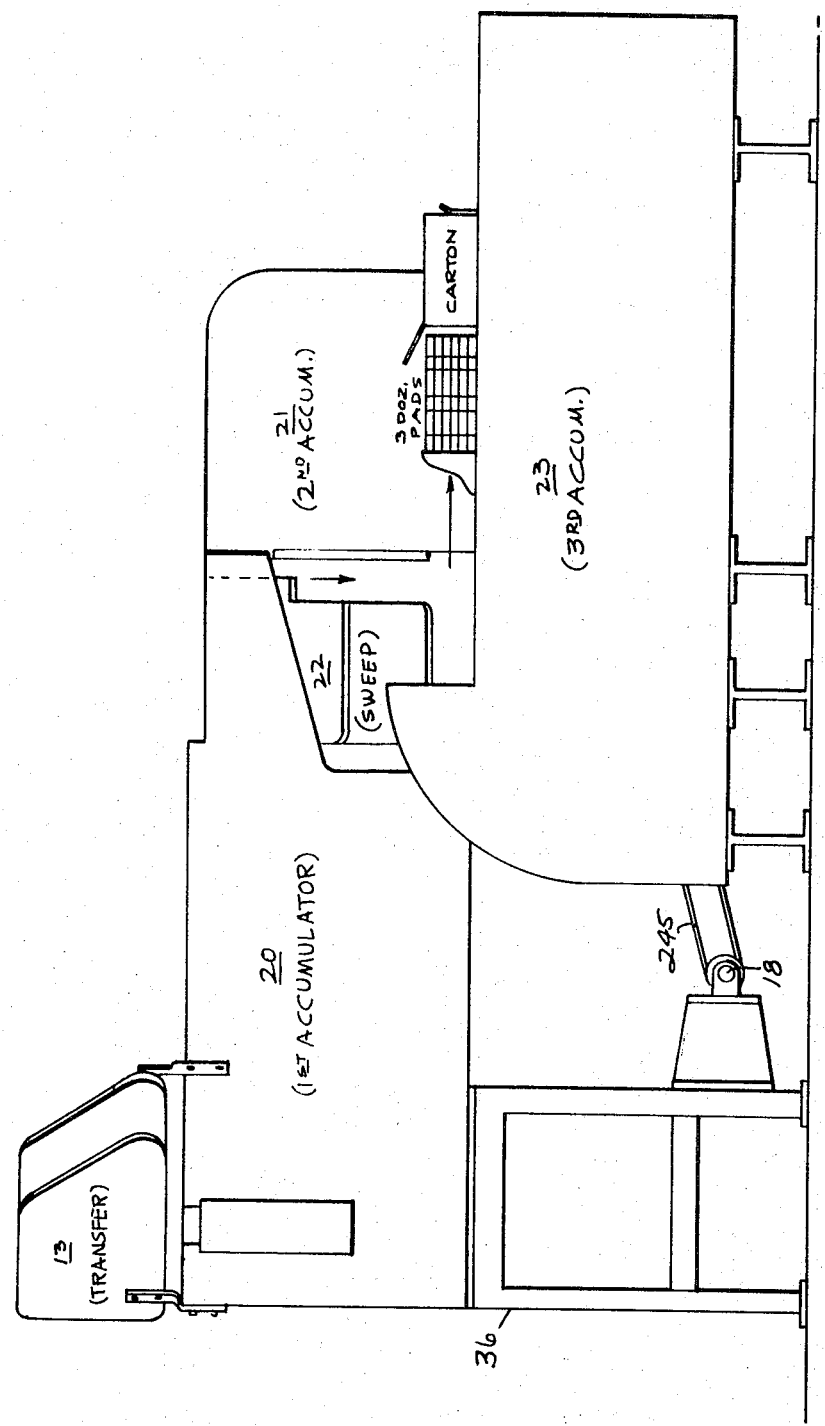

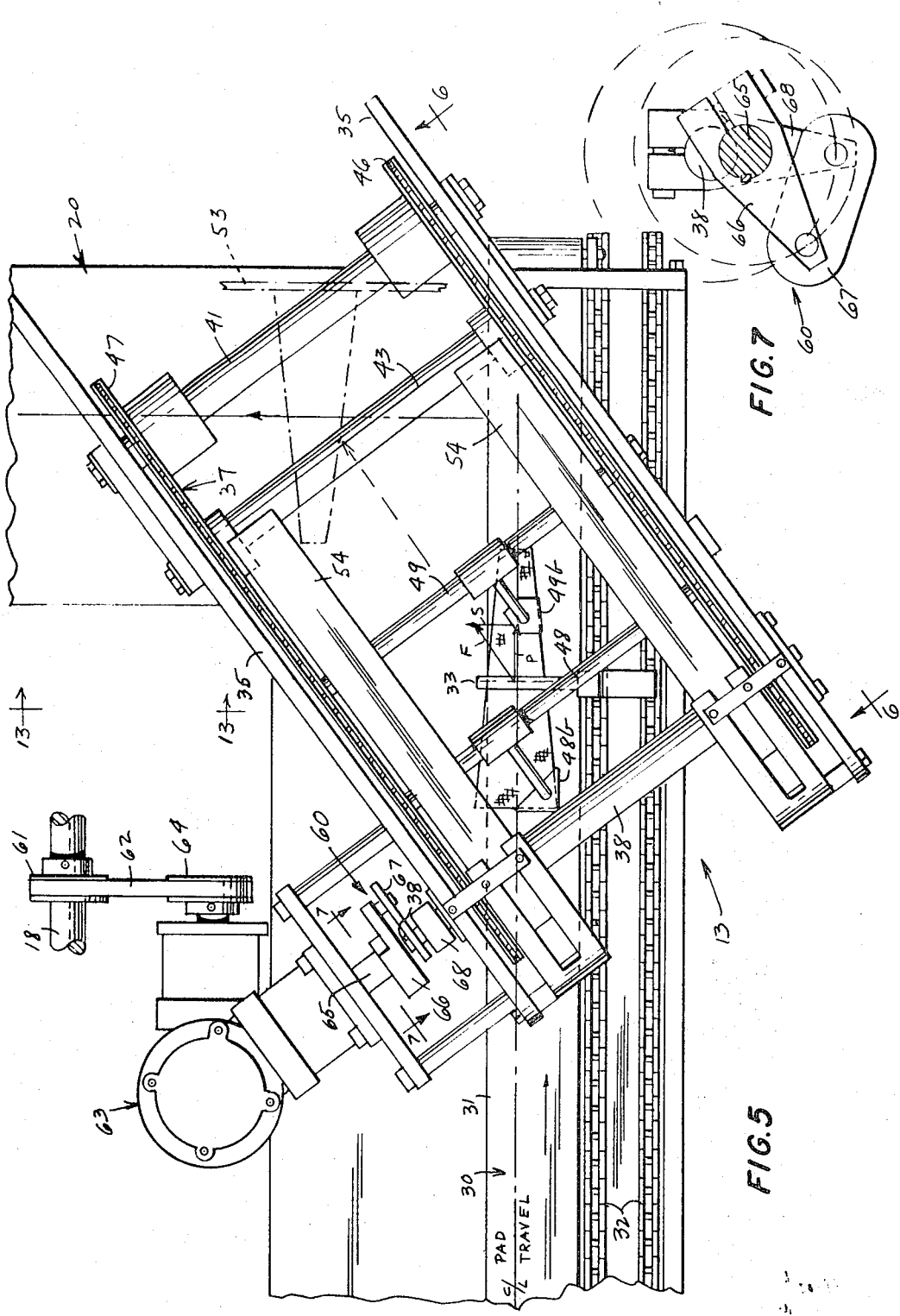

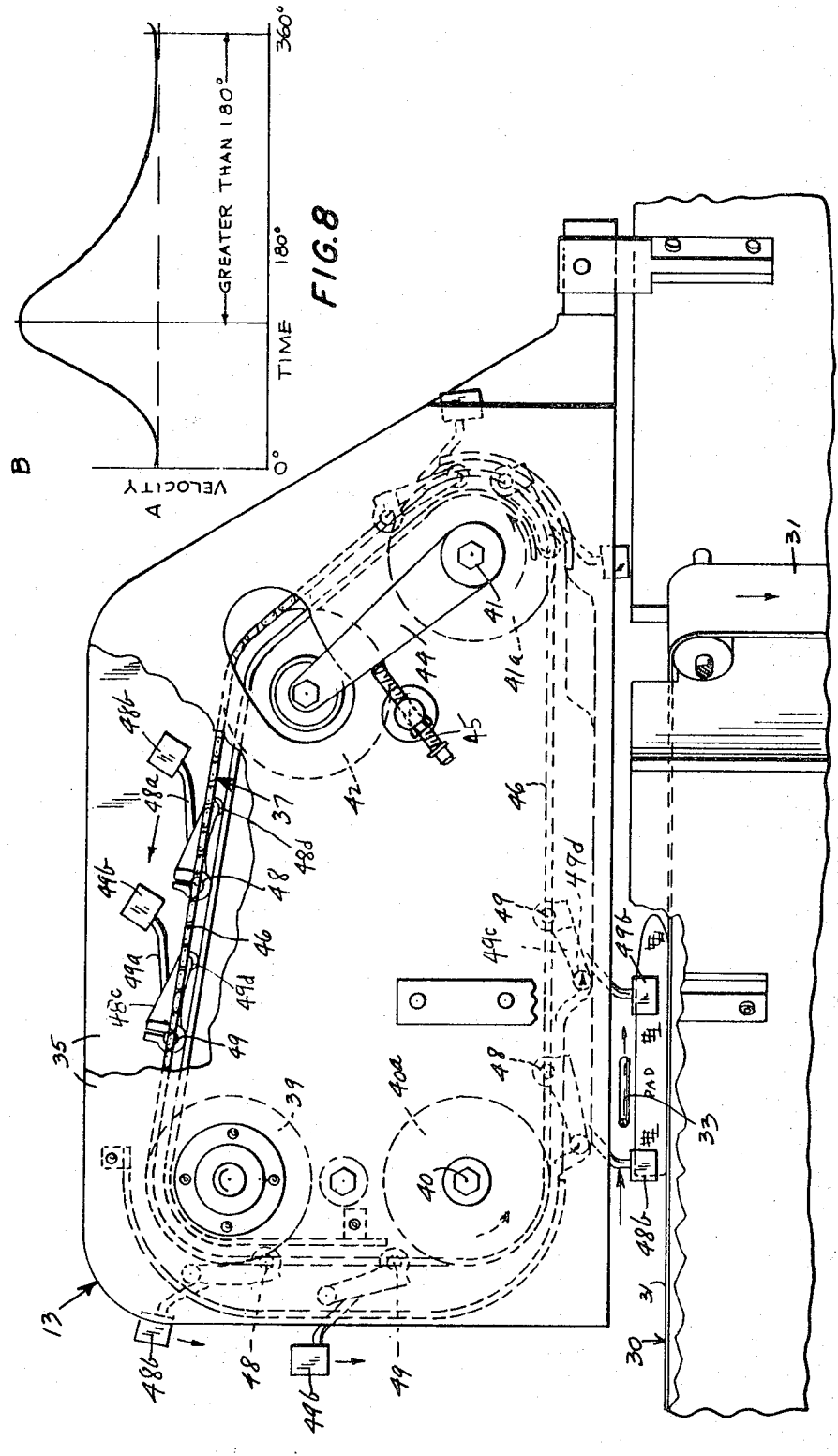

United States Patent Office

3,533,519
Patented Oct. 13, 1970

1

3,533,519
TRANSFER APPARATUS FOR ELONGATED
PADS AND THE LIKE
Richard D. Anderson, Neenah, Wis., assignor to Kimberly-Clark Corporation, Neenah, Wis., a corporation of Delaware
Original application Apr. 21, 1964, Ser. No. 361,455, now Patent No. 3,329,252, dated July 4, 1967. Divided and this application Dec. 13, 1966, Ser. No. 620,573
Int. Cl. B65h 3/30, 19/00
The portion of the term of the patent subsequent to July 4, 1984, has been disclaimed and dedicated to the Public
U.S. Cl. 198—20                3 Claims

ABSTRACT OF THE DISCLOSURE

Elongated tapered sanitary pads with their end tabs folded over as manufactured by a tapered pad machine are delivered in line, end to end, with their wide ends to wide ends, and narrow ends to narrow ends.

---

This application is a divisional application of application Ser. No. 361,455, filed Apr. 21, 1964, which issued as patent No. 3,329,252 on July 4, 1967.

The present invention is directed to improvements in apparatus for transferring tapered sanitary pads and the like from an in line spaced apart position on a conveyor to an endwise position adjacent a fence barrier for further movement.

These tapered pads are transferred at an angle from their in line delivery to be accumulated in groups in side by side position so that the end pads in each group have their elongated sides generally parallel to each other with their ends staggered a little but in approximate alignment. These groups are by other apparatus (not shown) accumulated in stacks and the stacks may be accumulated with one stack above another stack. The accumulated side by side stacks are pushed as an accumulated group of stacks into an open ended carton.

The apparatus is an endless conveyor arranged at an angle above an oncoming line of spaced elongated pads. The endless conveyor is arranged in a vertical attitude with a generally horizontal bottom and top run. There are spaced apart endless chains guided in a framework having guides for each chain. Between the two parallel spaced apart chains there is pivotally supported spaced apart rods. For moving a pad there are two such spaced apart pivotally mounted rods in a group, their spacing being about the length of an elongated pad to be transferred. To each rod of a group there is rigidly affixed arms that have pad engaging flights on their ends. Each cross rod has a rigid arm attached that has a roller on its end. The roller on each rod arm has a cam track that it rides against to pivot the arm to engage a pad at the beginning of the bottom run and to retract the arm at the end of the bottom run. Each cross rod is spring biased in one direction so as to hold its roller against its cam track. The endles chains are supported by sprockets on cross shafts. One cross shaft and its sprockets affixed to rotate therewith is driven by a drive mechanism. This drive mechanism has incorporated therein a drag link drive so that at the beginning of the bottom run in which a single pad is conveyed by the bottom run of the conveyor, the conveyor is speeded up in its linear movement to afford a velocity component at time of pad contact equal to the speed of the oncoming contacted pad. There follows an increase in the speed during the removal of the pad from its in line position and this is followed by decreasing the speed of pad travel for delivery of the pad at the end of the bottom run where the pad contacting arms are retracted as the pad is positioned endwise against a fence or barrier for further movement.

An object of the invention is to provide an angle transfer conveyor for transferring pads from an oncoming in line position to a side by side position in groups of pads for an accumulator.

For a more complete understanding of the invention reference is had to the following drawings, the description and the claims that follow.

FIG. 1 is a schematic layout of a tapered pad making machine and accumulator of the tapered pads;

FIG. 2 is a plan view of the tapered pad with the formed end tabs extended;

FIG. 2A is a perspective view of the tapered pad with end tabs folded over ready to be accumulated and packaged.

FIG. 3 is a side elevation of the pad accumulator mechanism as viewed at the right-hand end of FIG. 1 on an enlarged scale;

FIG. 5 is a top plan view of the transfer mechanism;

FIG. 6 is a side elevation of the transfer mechanism viewed generally along line 6—6 of FIG. 5;

FIG. 7 is a view along line 7—7 of FIG. 5 of a drag link drive mechanism for the transfer mechanism;

FIG. 8 is a time versus velocity graph of the drive of the angle transfer mechanism of a completed pad;

Throughout the description like reference numbers refer to similar parts.

Figure 4:
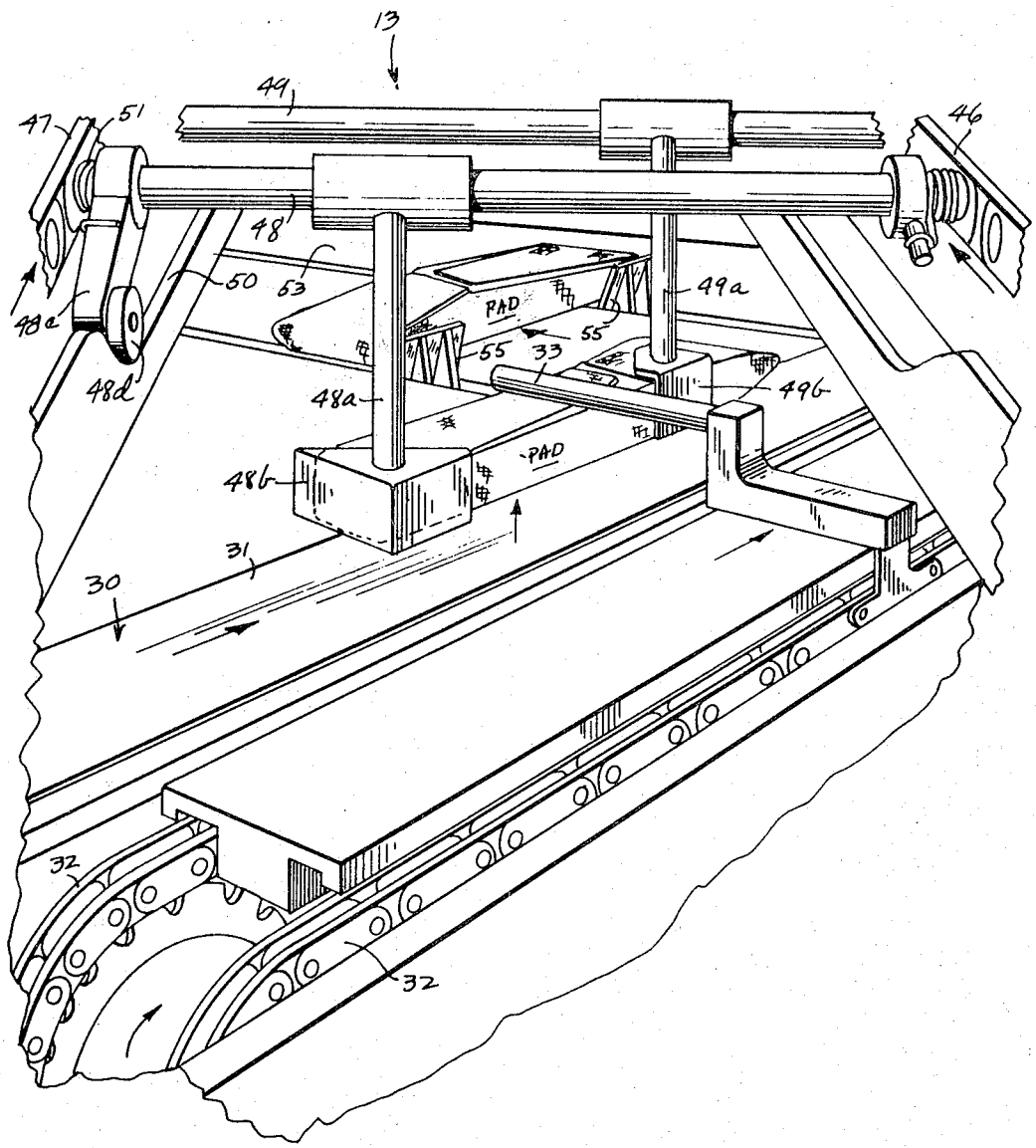
FIG. 4 is a diagrammatic perspective view at the right-hand lower corner of FIG. 1 showing the transfer of the complete pads in a first accumulator where the pads are accumulated by twos.

FIG. 1 is a diagrammatic plan view of the sanitary pad making machine and angle transfer mechanism of completed pads and outline of all of the accumulator mechanism of which the angle transfer and fence barrier means is the subject of this application. An outline of the making of the tapered pad is briefly made for background. It is the subject of a separate application. The wadding is made of laminations and wrap at 1 and intermittently fed through an intermittent feed conveyor 2 which has associated therewith a corner cutter 3 for the pads to be formed. The intermittent feed 2 feeds the wadding which has the proper corner cuts made therein to a pair of slitters at station 4, each of which cuts at an angle to make the tapered pads. The pads specifically are in the shape of an isosceles trapezohedron as shown in FIG. 2A. A continuous running conveyor 5 transports the pads from the slitter in equal spaced relation in a general parallel attitude to each other to the end of the continuous conveyor 5. A transverse pad feed conveyor 6 pulls off each pad individually and transfers it in equal spaced end to end relation to a displacement mechanism 7. This displacement mechanism 7 is necessary to properly space the pads in a line with their wider ends closer together and their narrower ends further apart. The sanitary pads are worn by the user with the narrower end which has the longer tab positioned to the back while the wider end is at the front with the shorted tab is positioned to the front. The displacement mechanism at station 7 transfers the spaced pads to a wrap and mask applying and folding mechanism 8 where the tapered pads are contained in the tubular web with a uniform cross section equal to the larger end of the pad. After folding the wrap and mask the pads pass with wrap and mask thereon to a former 9 for forming up the loose wrap, thence to a calendering station 10, to a tab cutter and front tab folding and tab conveying mechanism 11, thence to a rear tab folding and pad conveying mechanism 12 and finally to an angle transfer mechanism 13, the subject of this application where the completed pads are transferred to accumulators 20, 21, and 23.

In FIG. 1 a main drive motor drives through a drive shaft 14 to a right angle gear box 15. From gear box 15 is driven another drive shaft 16 to a right angle reducer gear box 17 which has an output shaft 18 leading further on therefrom. This output shaft 18 through suitable drive connections to be described, drives the accumulator mechanism. Driving power for the various mechanisms is taken off from these shafts and gear boxes as necessary.

Since the pads are tapered they are accumulated by twos that are oppositely disposed as shown diagrammatically at the right-hand side of FIG. 1. However, more than two could be accumulated under the same principle.

The finished pads are transferred at an angle by the transfer mechanism 13 to a first accumulator in the zone indicated at 20 and moved by it to a second accumulator 21 that is a vertical elevator to accumulate a stack of two abreast pads. A sweep 22 moves the accumulated stack of pads at 21 to the right and onto a vertically movable table or elevator of a third accumulator 23. The elevator decends and the stack of pads is moved along a bed by flights on the third accumulator 23 and on into a carton that lays on its side, all as will be hereinafter described.

In FIG. 3 there is a diagrammatic vertical side elevational view showing of the accumulators. As an illustration the elevator of the second accumulator 21 accumulates a stack of one-half dozen pads, these are swept onto the elevator of the third accumulator which descends and accumulates one dozen pads. The third accumulator moves the accumulated one dozen along and accumulates a total of three dozen pads that are pushed along further sideways into a carton. Any number of pads could be collected in a stack by proper arrangement.

TRANSFER MECHANISM TO FIRST ACCUMULATOR

The pad has been transferred to a transfer mechanism 13 and has been fully fabricated and has its tabs folded over. These tapered pads, as explained heretofore, arrive at the transfer mechanism 13 in line and properly spaced. The small or narrow end of each pad is spaced next to the small end of the next pad the equivalent of two long tab lengths. The larger or wider end of each pad is spaced next to the large end of the next pad the equivalent of two short tab lengths.

In general this transfer mechanism 13 transfers the pads at about a 37° angle from the approaching line of finished pads, see FIG. 1, to the first accumulator 20.

The pad has been moved up to the transfer mechanism 13, see FIG. 4, on an endless conveyor generally indicated at 30 having a conveyor belt 31. A tab folder 33 has been moved along by an endless conveyor 32 which travels faster than the endless conveyor belt 31 and thus folds the rear tab over the pad.

The transfer mechanism 13 has a pair of spaced apart side plates 35 mounted on the top end of a frame 36, see FIG. 3. Between the plates 35 is an endless chain conveyor 37 which has a drive shaft 38 mounting spaced apart drive sprockets 39. Idler sprocket mounting shafts are indicated at 40 and 41 in a horizontal spaced apart line as shown in FIG. 6 in the lower part of the plates 35. Each of the shafts 40 and 41 has respective idler sprockets 40a and 41a thereon. A pair of take-up sprockets 42 are mounted on a shaft 43 that is supported on arm 44 pivoted on shaft 41. An adjusting screw mechanism for arm 44 is shown at 45.

About the sprockets are trained endless chains 46 and 47. Pivotally mounted between these chains 46 and 47, see FIG. 4, are four pair of spaced cross rods 48 and 49 with each pair spaced in proper position along the chains. Fast to each rod 48 is a depending arm 48a having a flight 48b that has a top and two sides to contact a rear corner of a pad. The cross rod 49 has a like depending attached arm 49a and a flight 49b at its end having a top and a side to engage a side of a pad. The positioning of these flights 48b and 49b will of necessity be altered to take care of the spacing and positioning of the oncoming respective pads to be moved by the respective pairs of flights and the positioning of the tapered pads as respects narrow and wider ends.

At the far end of rod 48, see FIGS. 4 and 6, is attached a cam arm 48c having a cam follower roller 48d on its end. This cam followers 48d rides on a cam track 50. A tension spring 51 on rod 48 presses arm 48c to hold its cam follower 48d against its cam track 50.

In FIG. 6 a cam arm 49c depends from rod 49 and has a cam follower 49d on its end which rides on a right-hand track 52, see FIG. 4.

The cam tracks 50 and 52 raise and lower the respective flights 48b and 49b so as to contact an oncoming pad and transfer it, see FIG. 5, off of conveyor belt 31 at an angle of about 37° until its leading end rests against a fence or barrier means 53. In FIG. 5 there is also shown a pair of elongated guard plates 54 for the cam arms attached by brackets 54a to the side plates 35. The successive positoins of two pads as moved by the transfer mechanism 13 are shown in FIG. 5. It will be noted that the pads arrive at the fence 53 with their axes at 90° to the fence 53.

The variable speed drive of the drive shaft 38 of the transfer mechanism 13 is shown in FIG. 7 as a drag link mechanism 60. The drive of this mechanism 60 is from the secondary drive shaft 18. Shaft 18 has a pulley 61 which drives a belt 62 leading over a pulley 64 on a right angle reducer generally indicated at 63 whose output shaft is indicated at 65 in FIG. 7. This driving shaft 65 has a crank arm 66 secured thereto. At the end of arm 66 is pivotally connected a drag link 67. This drag link 67 is pivotally connected to the outer end of an arm 68 which is clamped to shaft 38 to drive the same. The shaft 65 drives at constant speed and through the drag link arrangement the shaft 38 is driven at a variable speed as shown illustratively in the graph in FIG. 8. The normal rate of drive of shaft 38 is velocity at A in FIG. 8. The velocity increases to a velocity B and then decreases as indicated by the graph back to velocity A. The shaft 38 rotates more than 180° in its change of speed from maximum B to normal speed A and this timewise is greater than the time for the shaft to increase from normal velocity A to maximum velocity B. The speed increase of shaft 38 from A to B is to move the flights 48b and 49b and the pad contacted thereby at maximum velocity, which component is equal to the velocity of the oncoming pad travel on belt 31. It is important to remove the pads from the belt in a smooth but expedicious fashion. In the vector diagram shown in FIG. 5, P eaquals the pad velocity on belt 31, F equals the velocity of the flights 48b and 49b on contacting a pad, and S equals the side movement velocity of the pad. The component of F in the direction of pad movement on the belt is equivalent to pad velocity P at the time the flights contact the pad.

In FIG. 4 the transfer conveyor 13 moves the pads to a position where their leading end is against the fence 53 with their longitudinal axis perpendicular to the fence. From this position that pads so deposited are further moved by the accumulator apparatus 21, 22 and 23.

I claim as my invention:

1. Transfer apparatus for elongated pads from an in line spaced apart position to a side by side position comprising, in combination, a conveyor means carrying said pads in said in line spaced apart position to an adjacent angle transfer apparatus for said pads, a fence means spaced adjacent said angle transfer apparatus against which said pads come to rest for further transfer and a conveyor means adjacent said fence means for transferring said pads therefrom, said angle transfer apparatus including an endless conveyor means having a bottom run above said oncoming pads, movably mounted pad engaging means carried in spaced relation by said endless conveyor, means for lowering said engaging means into transferring contact with an oncoming pad, one only of said engaging means transiting said bottom run at a time, means to retract said engaging means as the pad is transferred to abut endwise said fence means and variable speed drive means for said endless conveyor to afford a velocity component at time of pad contact equal to speed of oncoming pad, increasing the speed during removal of said pad from its in line position and decreasing the speed of pad travel for end abutting delivery to abut said fence means.

2. An angle transfer apparatus for elongated pads according to claim 1 wherein said variable speed drive means for said conveyor is a drag link drive.

3. An angle transfer apparatus according to claim 1 wherein said endless conveyor includes spaced apart chains trained over sprockets, said pad engaging means are arms each rigidly mounted on shafts pivotally carried between said chains, said means to lower and retract said engaging means is an arm rigidly attached to said shaft and having a cam follower thereon and a cam track for the cam follower.

References Cited
UNITED STATES PATENTS

| | | | |
|---|---|---|---|
| 1,116,406 | 11/1914 | Fleischer | 198—110 |
| 2,497,767 | 2/1950 | Hallead | 198—25 |
| 2,666,535 | 1/1954 | Dooley | 198—188 |
| 3,166,181 | 1/1965 | Rutkus | 198—185 |
| 2,906,239 | 9/1959 | Socke | 198—41 |
| 3,068,987 | 12/1962 | Franklin | 198—24 |

RICHARD E. AEGERTER, Primary Examiner

U.S. Cl. X.R.

198—174